OR 4,003,629

United States

Baues et al.

[11] 4,003,629

[45] Jan. 18, 1977

[54] COUPLING DEVICE FOR LIGHT WAVES

[75] Inventors: Peter Baues, Krailling; Hans Mahlein, Munich; Gerhard Winzer, Munich; Achim Reichelt, Munich, all of Germany

[73] Assignee: Siemens Aktiengesellschaft, Berlin & Munich, Germany

[22] Filed: July 16, 1975

[21] Appl. No.: 596,520

[30] Foreign Application Priority Data

July 17, 1974 Germany .......................... 2434443

[52] U.S. Cl. ........................ 350/96 C; 350/96 WG
[51] Int. Cl.² .......................................... G02B 5/14
[58] Field of Search ..................... 350/96 C, 96 WG

[56] References Cited

UNITED STATES PATENTS

| | | | |
|---|---|---|---|
| 3,208,342 | 9/1965 | Nethercot, Jr. | 350/96 WG |
| 3,883,220 | 5/1975 | Taylor | 350/96 WG |
| 3,904,270 | 9/1975 | Cheo | 350/96 C |
| 3,909,108 | 9/1975 | Taylor | 350/96 C |

*Primary Examiner*—John K. Corbin
*Assistant Examiner*—Stewart Levy
*Attorney, Agent, or Firm*—Hill, Gross, Simpson, Van Santen, Steadman, Chiara & Simpson

[57] ABSTRACT

An improved device of the type suitable for coupling light waves from a first waveguide into a second waveguide, both waveguides being arranged by an integrated technique on a given substrate in intersecting fashion one above the other. Insulated electrodes adjacent opposed faces of the waveguides at the intersection zone between the waveguides permit generation of an electric field in response to an applied voltage therebetween. By forming the waveguides of electro optical material having appropriate indices of refraction, coupling is achievable between first and second waveguides.

11 Claims, 3 Drawing Figures

COUPLING DEVICE FOR LIGHT WAVES

BACKGROUND OF THE INVENTION

A type of coupling device wherein light waves are coupled from a first into a second waveguide is described in an article by Miller printed in "The Bell System Technical Journal" Vol. 48, No. 7, 1969 page 2066. In this device, two waveguides are arranged on the same substrate in parallel, closely adjacent relationship to one another over a given distance. The fields of light waves conducted in the first waveguide extend into the region of the second waveguide into which they are extended and forwarded. In this device, it is not possible to control the extent of coupling of the light waves between the two waveguides.

BRIEF SUMMARY OF THE INVENTION

More particularly, the present invention is directed to a type of device adapted for coupling light waves from a first waveguide into a second waveguide. The device, including both waveguides, is supported by a substrate. The device is manufactured utilizing, for example, the principles of the so-called integrated manufacturing technique.

Each waveguide is elongated and comprised of an electro-optical crystal. Each waveguide is adapted for the travel of predetermined light waves along a predetermined direction therein extending longitudinally therethrough. The index of refraction of one of such waveguides is $n_1$ while the index of refraction of the other of such waveguides is $n_2$.

Such waveguides are interrelated by having $n_1$ greater than $n_2$ when said waveguides are both in an electric field free state, and by having $n_1$, less than or equal to or greater than $n_2$ when said waveguides are both in an electric field of predetermined strength. In a device of this invention, such waveguides are spatially oriented in adjacent relationship to one another with such predetermined direction of one said waveguide extending across such predetermined direction of the other said waveguide. A zone of intersection is defined between the so oriented such waveguides.

A device employs a pair of electrode constructions, each one being comprised of (a) a plurality of spaced, parallel, electrically conductive grating members, (b) an electrically conductive leader member, and (c) electrical interconnection means joining each of said grating members to said leader member.

Each one of such electrode constructions is spatially oriented adjacent a different one of said waveguides with such intersection zone therebetween. Specifically, the grating members of each electrode construction are in spaced, parallel relationship to the grating members of the other such electrode construction.

In a device, dielectric insulation means is interposed between each of such electrical constructions and its adjacent such waveguide. Each such insulation means has an index of refraction which is substantially lower than each of $n_1$ and $n_2$ when such insulation means is either in an electric field free state or in said electric field.

The invention is further directed to a process for coupling together a pair of waveguides and to a process for transferring by coupling light waves travelling in one waveguide into another waveguide.

An aim of the present invention is to provide a device for coupling light waves from one waveguide into another utilizing an electric field and electro-optical materials.

Another aim is to provide a process for coupling together a pair of waveguides comprised of electro-optical materials utilizing an electric field.

Another aim is to provide a process for transferring by coupling light waves from one waveguide to another.

Another aim is to provide a technique for modulating light waves being coupled from one waveguide into another waveguide.

Other and further aims, objects, purposes, advantages, features, and the like will be apparent to those skilled in the art from the present specification taken with the accompanying drawings.

DETAILED DESCRIPTION

Figure 1:
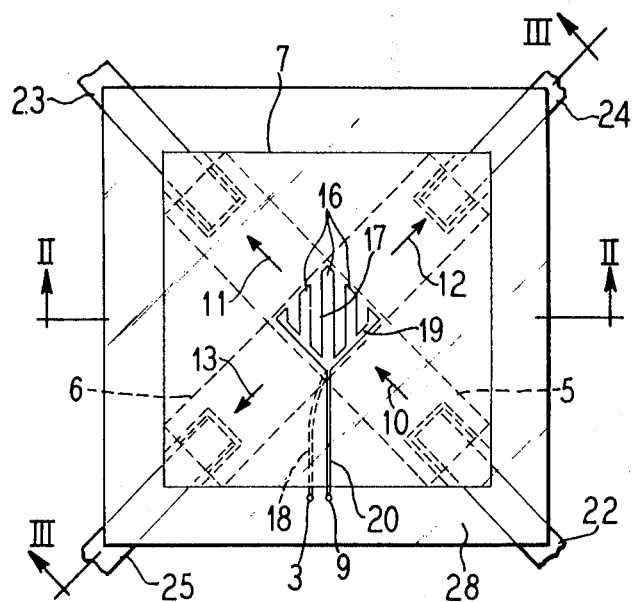
FIG. 1 is a diagrammatic plan view of one embodiment of a device of the present invention.

The function of a coupling device of this invention is explained as follows: In a field-free state, both of the waveguides possess substantially higher indices of refraction than the dielectric insulator layers positioned therebetween, and, in addition, in this state, the index of refraction $n_1$ of one of the waveguides is greater than the index of refraction $n_2$ of the other waveguide (e.g. $n_1 > n_2$). A light wave travelling in the first waveguide which approaches the intersection zone between the two waveguides continued to move forward in such first waveguide across such intersection zone. There is effectively no input-coupling of such light wave into the second waveguide in the intersection zone.

If an electric voltage is now applied across the pair of electrode constructions, so that an electric field exists thereacross, an electro-optical effect arises in the parts penetrated by the resulting electric field. Since each waveguide is comprised of an electro-optical crystal, this electric field causes a change in the index of refraction of each electro-optical crystal. By predetermining the crystal material and the magnitude of the electric field, the index of refraction $n_1$ of the first waveguide is now caused to be equal to, or smaller than, the index of refraction $n_2$ of the second waveguide, but $n_1$ and $n_2$ each continue to remain substantially greater than the index of refraction of the dielectric insulator layers. Now, the light wave travelling in the first waveguide, which approaches the intersection zone, is coupled into the second waveguide across the intersection zone by virtue of defraction on the electric field lattice and leaky wave guidance. If $n_1$ remains greater than $n_2$, the waveguides are coupled by defraction only.

As a result of their grating construction, as well as of their spatial location relative to the two waveguides, the electrode constructions permit one to achieve preferably a cumulation effect of the desired coupling.

Advantageously, particularly for ease of production, both waveguides can be constructed from the same electro-optical crystalline material. In this case, by means of techniques known to crystallography, the optical axes of each crystal forming each waveguide is arranged relative to a substrate in such manner than the respective light-waves propagated therethrough encounter indices of refraction $n_1 > n_2$ in the field-free state and indices of refraction of $n_1 > n_2$ in the presence of an electric field applied thereacross.

In particular, by the teachings of this invention, both the transverse and the longitudinal electro-optical effects existing within an electro-optical crystal can be exploited. For this purpose, an electrode arrangement is selected so that the resulting electric field produced therewith is either substantially perpendicular to, or substantially parallel to, the direction of travel of a light wave moving through the first waveguide.

In one embodiment of a device of this invention, it is preferred to have the substrate be in the form of an electrical semiconductor within or on one surface of which one of the two electrode constructions is produced by known techniques. Such an embodiment of a coupling device thus can be even more compact than in an embodiment wherein the substrate is an electrical insulator and an electrode construction is formed thereon by known techniques.

A coupling device of this invention not only permits a controllable coupling of the light waves delivered in the first waveguide, but also permits the modulation of the light waves during coupling thereof from the first into the second waveguide by varying the electric field intensity with respect to time.

Figure 2:
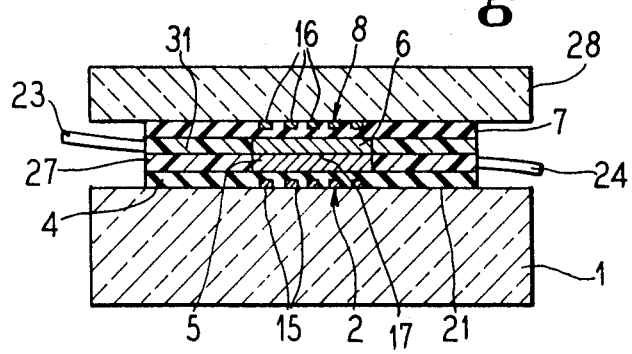
FIG. 2 is a diagrammatic vertical sectional view taken along the line II—II of FIG. 1.
Figure 3:
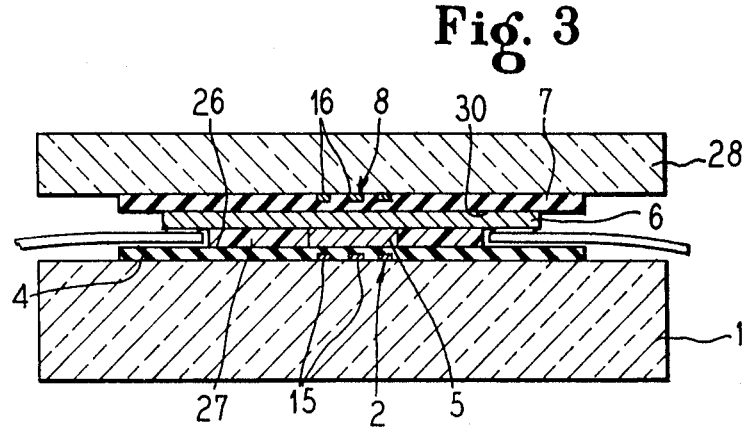
FIG. 3 is a diagrammatic vertical sectional view taken along the line III—III of FIG. 1.

Referring to FIGS. 1–3, there is seen arranged on a substrate 1 a first grating-equipped electrode construction 2 which is electrically connected by a conductor or leader member 18 to a connection terminal 3. Terminal 3 can be, in turn, connected to one pole of a voltage source (not shown) for operation of the device shown. The electrode construction 2 is electrically insulated from a first waveguide 5 by a dielectric insulation layer 4. Arranged above the waveguide 5 is another or second waveguide 6 which defines an intersection zone 17 therebetween. Over the waveguide 6 is a dielectric insulation layer 7. In turn, on or in (the latter form being shown in the present device) the layer 7 is arranged a second-grating equipped electrode construction 8 which is here similar to electrode construction 2 and which is electrically connected by a conductor or leader member 20 to a connection terminal 9. Terminal 9 can be, in turn, connected to the second pole of a voltage source (not shown) for operation of the device shown. The electrode constructions 2 and 8 are brought to coincidence with respect to one another so that each individual grating element 15 of electrode construction 2 is preferably in spaced, parallel arrangement to a corresponding individual grating element 16 of electrode construction 8.

In the device shown, each waveguide 5 and 6 has a cross-sectional shape which permits a desired light wave of prechosen frequency to travel therealong, typically from one end to the other thereof, the exact cross-sectional shape in any given instance being affected by the choice of the electro-optical crystalline material used and related matters. As a practical matter, and as those skilled in the art will appreciate, each waveguide has, cross sectionally, the shape of a parallelogram. Presently, typically and preferably this shape is rectangular. For purposes of the present invention, when employing waveguides which have a cross-sectionally rectangular configuration, it is preferred to place together in face-to-face engagement one side of waveguide 5 with one side of waveguide 6 using respective sides thereof which have a large cross sectional area compared to the narrow sides of each respective waveguide 5 and 6 which latter have a relatively smaller cross sectional area. While one waveguide can be spaced from the other thereof in a device of this invention, it is preferred to have the waveguides 5 and 6 be in adjacent (not shown), face-to-face engagement to minimize energy losses and obtain a maximum degree of coupling therebetween.

The direction along which predetermined light waves travel longitudinally through a waveguide 5 or 6 can be considered to be exemplified by an optical axis of the electro optical crystalline material comprising each waveguide 5 or 6. The term "direction" as used herein is not equivalent to the term "path" which relates to the manner in which light waves traverse a given waveguide or other member in a light system.

The optical axis (not shown) of waveguide 5 is preferably in a hypothetical plane which is in spaced, parallel relationship to a hypothetical plane holding the optical axis (not shown) of waveguide 6, though such need not be the case. In general, one of the respective waveguides, such as 5 should have an optical axis which extends along the direction of travel of light waves therein and which extends across (but not through) a corresponding optical axis extending along the direction of travel of light waves in the other of such waveguides, such as 6.

Each of the waveguides 5 and 6, can comprise, for example, crystalline potassium dihydrogen phosphate. Thus, each waveguide 5 and 6 is conveniently cut out from electro-optical material and each such cut piece is oriented spatially relative to the other thereof by its respective optical axes in such a manner that, in the field-free condition, the index of refraction $n_1$ of the waveguide 5, as for a light wave travelling therein and approaching the intersection zone 17 generally in accordance with a direction illustrated by the arrow 10, is greater than the index of refraction $n_2$ of the waveguide 6 as for a corresponding light wave travelling in such waveguide 6. A light wave in waveguide 5 incoming towards intersection zone 17 in the direction 10 is forwarded in the waveguide 5 in a direction illustrated by the arrow 11 past intersection zone 17. If a voltage source is now connected across the terminals 3 and 9, the index of refraction of each of the waveguides 5 and 6 in the intersection zone 17 between the electrode constructions 2 and 8 change in such manner that the index of refraction $n_1$ now alternates and possibly becomes smaller than the alternating index of refraction $n_2$. This change results in defraction and leaky wave guidance in the intersection zone 17 which causes a light wave delivered to intersection zone 17 in waveguide 5 travelling in the direction 10 to be input coupled into the waveguide 6 and to travel therein generally in the directions illustrated by the arrows 12 and 13.

Application of a modulated or variable applied voltage to the terminals 3 and 9 results in a modulation in intensity of the respective light waves forwarded in the directions 11, 12 and 13 which approximately corresponds to the modulation of variation associated with such applied voltage. Connector assemblies designated as 22, 23, 24 and 25, respectively, are each coupled by known means to a different respective individual one of the four end regions of the individual waveguides 5 and 6 during operation of the device, for operative incorporation of such device into a light regulation apparatus.

During operation of such device, coupling of light waves from waveguide 5 into waveguide 6 occurs whenever, in the intersection zone 17 between the waveguides 5 and 6 where electric fields are exhibited, the different ($n_1 - n_2$) in the indices of refraction is 0 or is negative. If the difference ($n_1 - n_2$) is positive, the coupling is achieved by defraction.

As indicated, the present invention involves a light waveguide coupling process. Such a process involves, for example, the step of spatially orienting a pair of waveguides, such as 5 and 6, in adjacent relationship to one another. Each one of such waveguides is comprised of an electro-optical crystal and adapted for the travel of predetermined light waves along a predetermined direction therein extending longitudinally therethrough. The index of refraction of one of said waveguides is $n_1$, and the index of refraction of the other of said waveguides is $n_2$. These waveguides are interrelated by having $n_1$ greater than $n_2$ when such waveguides are both in an electric field free state, and also by having $n_1$ less $n_2$ and by having spatial alterations of $n_1$ and $n_2$ when such waveguides are both in an electric field of predetermined strength. The orienting in general is such that:

1. the direction light waves travel longitudinally through one such waveguide intersects the direction light waves travel longitudinally through the other such waveguide,
2. a zone of intersection is defined between the so oriented such waveguides,
3. said predetermined direction of one such waveguide extends across said predetermined direction of the other such waveguide, and
4. a zone of intersection is defined between such waveguides.

As a second step in such waveguide coupling process, one positions a pair of electrode constructions in dielectrically insulated adjacent relationship to such waveguides. Each one of such electrode constructions is adjacent a different one of such waveguides with such intersection zone therebetween. Such electrode constructions, in response to a voltage differential applied thereacross, are adapted to produce therebetween an electric field of predetermined characteristics. As also indicated, the present invention includes a process for coupling light waves from one waveguide into another. This process involves as a first step the inputing of predetermined light waves into a first waveguide wherein such input light waves are adapted to travel along a first predetermined direction therein extending longitudinally therethrough. Such first waveguide is comprised of an electro-optical material and has indices of refraction $n_1$.

As a next step, this process involves maintaining a second waveguide spatially oriented relative to such first waveguide. This second waveguide is adapted to conduct therethrough along a second predetermined direction therein extending longitudinally therethrough such predetermined light waves. Such second waveguide is likewise comprised of an electro-optical material but has indices of refraction $n_2$. Such second waveguide is interrelated to such first waveguide by having $n_1$ greater than $n_2$ when said first and said second waveguides are both in an electric field free state, and by having $n_1$ less than $n_2$ and by having spatial alterations of $n_1$ and $n_2$ when said waveguides are both in an electric field of predetermined strength. Such maintaining is so carried out that:

1. the direction light waves travel longitudinally through said first waveguide intersects the direction light waves travel longitudinally through said second waveguide,
2. a zone of intersection is defined between said first and said second waveguides,
3. said predetermined direction of said first waveguide extends across said predetermined direction of said second waveguide, and
4. a zone of intersection is defined between said first and said second waveguides.

As another step, this process involves applying generally transversely across said first and said second waveguides with said intersection zone therebetween an electric voltage potential difference to produce thereacross an electric field of predetermined characteristics. Preferably, such electric field comprises a plurality of spaced parallel zones, each such zone comprising a relatively more intense electric field than in spatial regions on each side thereof. The individual zones can have a thickness ranging from about 0.2 to 100.0 $\mu$m (microns) and the distance measured across individual zones can range from about 0.2 to 100.0 82 m. Such electric field is produced by a pair of electrode constructions as above described. In one operating mode, this electric field changes with respect to time. Preferably, in such mode, the electric field is modulated with information by varying the amplitude of said electric field with respect to time in a predetermined manner.

EMBODIMENTS

The present invention is further illustrated by reference to the following examples. Those skilled in the art will appreciate that other and further embodiments are obvious and within the spirit and scope of this invention from the teachings of these present examples taken with the accompanying specification.

EXAMPLE 1

Device preparation:

In a first operation, a clean glass plate corresponding to substrate 1 in FIG. 1 with an optically flat surface 21 is subjected to vacuum vapor deposition of a layer about 0.1 microns thick of copper. Thereafter, the copper layer is masked photolithographically to define thereon an electrode construction of the type shown in FIG. 1 as 2 having a plurality of spaced, parallel electrically conductive grating members or elements 15, a leader member 18, and electrical interconnection members (not shown in FIGS.). Next, this so masked copper is etched by known technique to remove the unmasked copper and leave a desired electrode construction 2 on surface 21 of substrate 1. The width of each grating member (measured transversely across such) is uniform and is about 0.7 $\mu$m and the grating members 15 are in spaced, parallel relationship to each other. The spacing between adjacent grating members 15 is about 0.7 $\mu$m. The location and size of the network comprising grating members 15 in electrode construction 2 is such as to underlie the entire anticipated intersection zone 17 between wavelengths 5 and 6.

In a second operation, over the entire central surface region of substrate surface 21, including grating members 15, interconnection members and portions of leader member 18, is placed a dielectric insulation layer 4 of polyimide resin. The starting ingredients for such a layer 4 (pyromellitic dianhydride and an aromatic diamine) are first preliminarily reacted to form a polyamide acid which reaction product is first applied in a manner similar to that employed for applying a conventional photo-resist layer. Thereafter, this polyamide layer is converted to the desired polyimide layer using temperatures of from about 350° to 500° C. A suitable starting material is commercially available from the E. I. du Pont de Nemours and Co. of Wilmington, Del. under the trade designation Type SP-1. In order to make the upper, now exposed, surface 26 of layer 4 be substantially optically flat, such surface is subjected to a lapping operation using conventional glass grinding and polishing technology.

In a third operation, on the surface 26 of layer 4 is now diagonally positioned waveguide 5. Waveguide 5 has a cross sectionally rectangular configuration and is comprised of potassium dihydrogen phosphate. Waveguide 5 is cut from a single crystal of potassium dihydrogen phosphate and has a length of about 20.0 mm, a width of about 3.0 mm, and a height of about 0.002 mm. One of the crystal axis of waveguide 5 extends lengthwise therethrough.

In a fourth operation, around the side edges of waveguide 5 and over layer 4 is placed a layer 27 of polyamide acid resin which is not heat cured to the polyimide form to avoid exposing the waveguide 5 to elevated temperatures. The thickness of layer 27 is generally uniform and equal to the thickness of waveguide 5. Slots are provided in layer 27 during its formation for purposes of permitting occupancy therein without restriction of connector assemblies to waveguide 6 (see description below) in the assembled device.

Next, such first, second, third and fourth operations above described are repeated. Thus, in place of glass substrate 1, a glass substrate 28 is used having an optically flat surface 29 upon which is formed an electrode construction 8 having components and dimensions substantially identical to those of electrode construction 2. Thus electrode construction 8 has grating members 16, a leader member 20 and interconnection members 19. Over the surface 29 and electrode construction 8 is deposited a dielectric insulation layer 7 of polyimide resin whose exposed surface 30 is flattened by mechanical abrasion. Waveguide 6, which is similarly formed compared to waveguide 5 and has similar dimensions, is positioned diagonally on surface 30 and around the side edges of waveguide 6 is placed a layer 31 of polyamide acid resin analogously to layer 27. Waveguides 5 and 6 have the following indices of refraction:

|  | Electric field free index of refraction | index of refraction in presence of applied electric field of volts applied transversely thereacross |
|---|---|---|
| waveguide 5 | 1.4596 | 1.4592 |
| waveguide 6 | 1.4499 | 1.4503 |

Waveguide 6 is placed over waveguide 5 so that substrate 28 overlies substrate 1, with associated components being as above indicated, and also as illustrated in FIGS. 1–3. Substrate 28 is moved until electrode construction 8 is coincident over electrode construction 2.

The thus completed device demonstrates that light of a frequency of about $1.5 \times 10^{14}$ $H_z$ travelling in waveguide 5 is coupled as above indicated by defraction into waveguide 6 when a voltage of about 100.0 volts is applied across electrode constructions 2 and 8. When the voltage is varied with respect to time, the light waves coupled into waveguide 6 are also found to vary in intensity as do the light waves travelling in waveguide 5 beyond the intersection zone.

Other and further embodiments will be apparent to those skilled in the art without deparing from the spirit and scope of the present invention.

We claim:
1. A device for coupling light waves from one waveguide to another comprising in combination
   A. two elongated waveguides,
      1. each one comprised of an electro-optical crystal and adapted for the travel of predetermined light waves along a predetermined direction therein extending longitudinally therethrough,
      2. the index of refraction of one of said waveguides being $n_1$, the index of refraction of the other of said waveguides being $n_2$,
   B. said waveguides being interrelated by having
      1. $n_1$ greater than $n_2$ when said waveguides are both in an electric field free state,
      2. $n_1$ less than $n_2$ when said waveguides are both in an electric field of predetermined strength,
      3. spatial variations of $n_1$ and $n_2$, when said waveguides are both in an electric field of predetermined strength,
   C. said waveguides being spatially oriented in adjacent relationship to one another with
      1. said predetermined direction of one said waveguide extending across said predetermined direction of the other said waveguide, and
      2. a zone of intersection defined between said waveguides,
   D. a pair of electrode constructions, each one being comprised of
      1. a plurality of spaced, parallel electrically conductive grating members,
      2. an electrically conductive leader member,
      3. electrical interconnection means joining each of said grating members to said leader member,
   E. each one of said electrode constructions being spatially oriented
      1. adjacent a different one of said waveguides with said intersection zone therebetween,
      2. with the grating members thereof in spaced, parallel relationship to the grating members of the other thereof,
   F. dielectric insulation means interposed between each of said electrical constructions and its adjacent said waveguide, each said insulation means having an index of refraction which is substantially lower than each of $n_1$ and $n_2$ when said insulation means is either in an electric field free state or in said electric field, and
   G. substrate means adapted to support said waveguides, said electrode constructions, and said insulation means.
2. The device of claim 1 wherein each grating member of one electrode construction is in spaced parallel relationship to a given grating member in the other electrode construction.
3. The device of claim 1 wherein each waveguide is comprised of potassium dihydrogen phosphate.
4. The device of claim 1 wherein each electrode construction is comprised of copper.
5. The device of claim 1 wherein each insulation means is comprised of an organic polymer.

6. A process for coupling together a pair of couplable waveguides comprising the steps of
A. spatially orienting a pair of waveguides in adjacent relationship to one another, each one of said waveguides being comprised of an electro-optical crystal and adapted for the travel of predetermined light waves along a predetermined direction therein extending longitudinally therethrough, the index of refraction of one of said waveguides being $n_1$, the index of refraction of the other of said waveguides being $n_2$, said waveguides being interrelated by having $n_1$ greater than $n_2$ when said waveguides are both in an electric field free state, and by having $n_1$ less $n_2$ and/or having spatial variations of $n_1$ and $n_2$ when said waveguides are both in an electric field of predetermined strength, said orienting being such that:
1. the direction light waves travel longitudinally through one such waveguide intersects the direction light waves travel longitudinally through the other such waveguide,
2. a zone of intersection is defined between the so oriented such waveguides,
3. said predetermined direction of one said waveguide extends across said predetermined direction of the other said waveguide, and
4. a zone of intersection is defined between said waveguides, and
B. positioning a pair of electrode constructions in dielectrically insulated adjacent relationship to said waveguides, each one of said electrode constructions being adjacent a different one of said waveguides with said intersection zone therebetween, said electrode constructions, in response to a voltage differential applied thereacross, being adapted to produce therebetween an electric field of predetermined characteristics.

7. A process for coupling light waves from one waveguide into another comprising the steps of
A. inputing predetermined light waves into a first waveguide wherein such input light waves are adapted to travel along a first predetermined direction therein extending longitudinally therethrough, said first waveguide being comprised of an electro-optical material and having indices of refraction $n_1$
B. maintaining a second waveguide spatially oriented relative to said first waveguide, said second waveguide being adapted to conduct therethrough along a second predetermined direction therein extending longitudinally therethrough such predetermined light waves, said second waveguide being comprised of an electro-optical material and having indices of refraction $n_2$, said second waveguide being interrelated to said first waveguide by having $n_1$ greater than $n_2$ when said first and said second waveguides are both in an electric field free state, and by having $n_1$ less than $n_2$ and/or having spatial variations of $n_1$ and $n_2$ when said waveguides are both in an electric field of predetermined strength, said maintaining being such that:
1. the direction light waves travel longitudinally through said first waveguide intersects the direction light waves travel longitudinally through said second waveguide,
2. a zone of intersection is defined between said first and said second waveguides,
3. said predetermined direction of said first waveguide extends across said predetermined direction of said second waveguide, and
4. a zone of intersection is defined between said first and said second waveguides, and
C. applying generally transversely across said first and said second waveguides with said intersection zone therebetween an electric voltage potential difference to produce thereacross an electric field of predetermined characteristics.

8. The process of claim 7 wherein said electric field comprises a plurality of spaced parallel zones, each such zone comprising a relatively more intense electric field than in spatial regions on each side thereof.

9. The process of claim 7 wherein said electric field is produced by a pair of electrode constructions,
A. each said electrode construction being comprised of
1. a plurality of spaced, parallel electrically conductive grating members,
2. an electrically conductive leader member,
3. electrical interconnection means joining each of said grating members to said leader member,
B. each one of said electrode constructions being spatially oriented
1. adjacent a different one of said waveguides with said intersection zone therebetween,
2. with the grating members thereof in spaced, parallel relationship to the grating members of the other thereof,
C. each one of said electrode constructions being insulated from its adjacent said waveguide by dielectric insulation means, said insulation means having an index of refraction which is substantially lower than each of $n_1$ and $n_2$ when said insulation means is either in an electric field free state or in said electric field.

10. The process of claim 7 wherein said electric field changes with respect to time.

11. The process of claim 10 wherein said electric field is modulated with information by varying the intensity of said electric field with respect to time in a predetermined manner.

* * * * *